(No Model.) 6 Sheets—Sheet 1.

C. LINDSTRÖM & W. T. MILLER.
MACHINE FOR TRUING CAR WHEELS.

No. 355,829. Patented Jan. 11, 1887.

WITNESSES:
Fred. G. Dieterich
Wm T. Emerson

INVENTORS
Charles Lindström and
William Tod Miller by
H. W. Beadle & Co.
ATTORNEYS.

(No Model.) 6 Sheets—Sheet 4.

C. LINDSTRÖM & W. T. MILLER.
MACHINE FOR TRUING CAR WHEELS.

No. 355,829. Patented Jan. 11, 1887.

Witnesses:
Wm T. Emerson
J. A. Dewitt

Inventors
Charles Lindstrom and
William Tod Miller by
H. W. Beadle &c.
Attys (No Model.) 6 Sheets—Sheet 5.

C. LINDSTRÖM & W. T. MILLER.
MACHINE FOR TRUING CAR WHEELS.

No. 355,829. Patented Jan. 11, 1887.

Witnesses:
Wm T. Emerson.
J. A. Dewitt.

Inventors
Charles Lindström and
William Tod Miller by
H. W. Beadle & Co. Attys

N. PETERS, Photo-Lithographer, Washington, D. C.

(No Model.) 6 Sheets—Sheet 6.
C. LINDSTRÖM & W. T. MILLER.
MACHINE FOR TRUING CAR WHEELS.
No. 355,829. Patented Jan. 11, 1887.
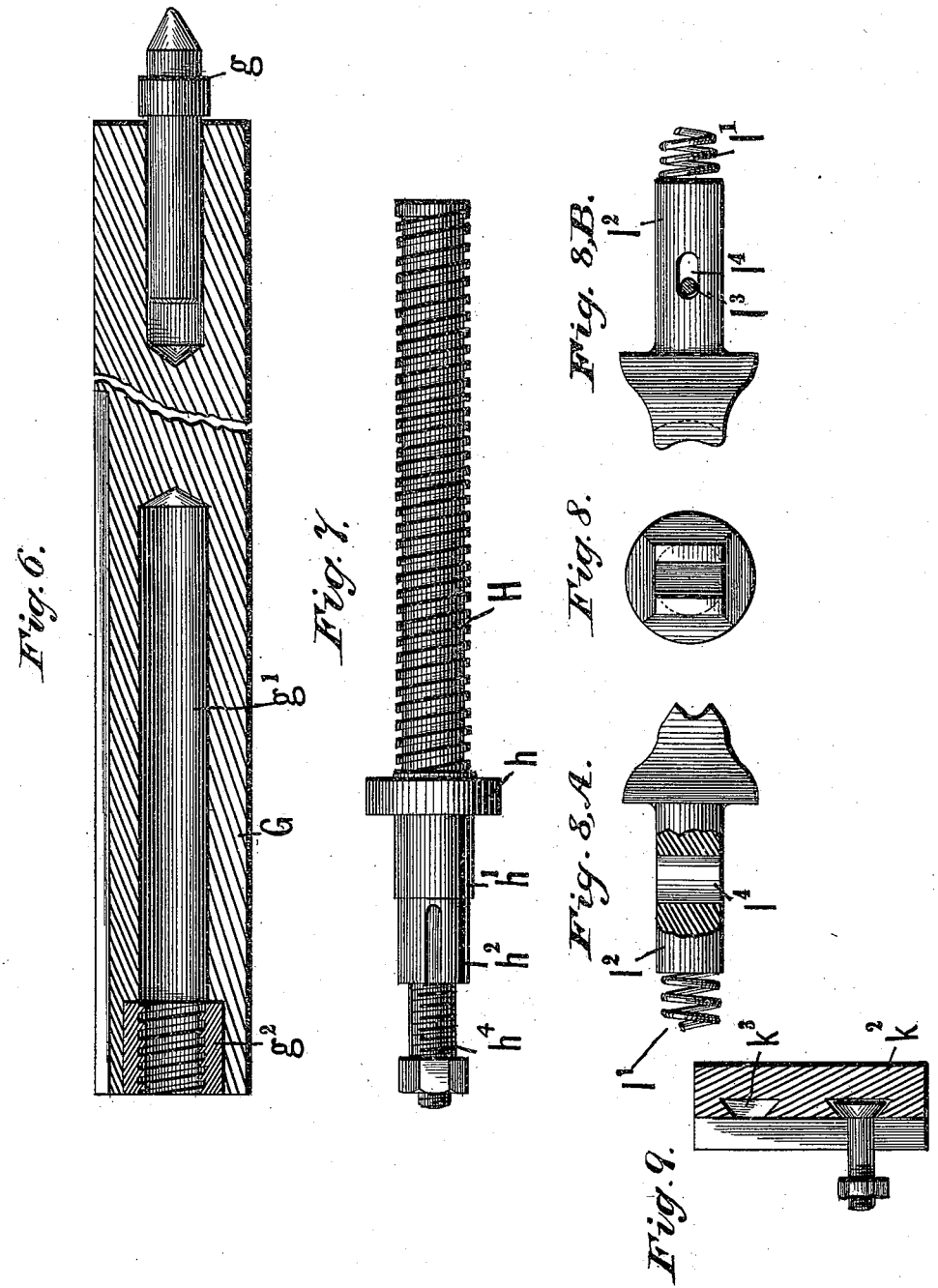

UNITED STATES PATENT OFFICE.

CHARLES LINDSTRÖM AND WILLIAM TOD MILLER, OF ALTOONA, PA.

MACHINE FOR TRUING CAR-WHEELS.

SPECIFICATION forming part of Letters Patent No. 355,829, dated January 11, 1887.

Application filed August 28, 1885. Serial No. 175,583. (No model.)

*To all whom it may concern:*

Be it known that we, CHARLES LINDSTRÖM and WILLIAM TOD MILLER, of Altoona, county of Blair, and State of Pennsylvania, have invented new and useful Improvements in Machines for Truing Car and Engine Truck-Wheels; and we do hereby declare that the following is a full and exact description of the same, reference being had to the accompanying drawings, and to the letters of reference marked thereon.

This invention relates to that class of machines the members of which are adapted to hold a pair of car-wheels united by their axle in revolving contact with the abrading-wheels of the machine, for the purpose of making true the peripheral bearing-surfaces of new wheels or wheels which have become untrue by service; and it consists, mainly, in the combination of certain old elements for centering the axle and wheels and certain old elements for adjusting the mechanism for clamping the wheels with certain new elements by means of which a yielding contact is made between the clamping parts, as hereinafter described and claimed.

It consists, further, in certain specific features of construction, which, in connection with the foregoing, will be fully described hereinafter and claimed.

Figure 1:
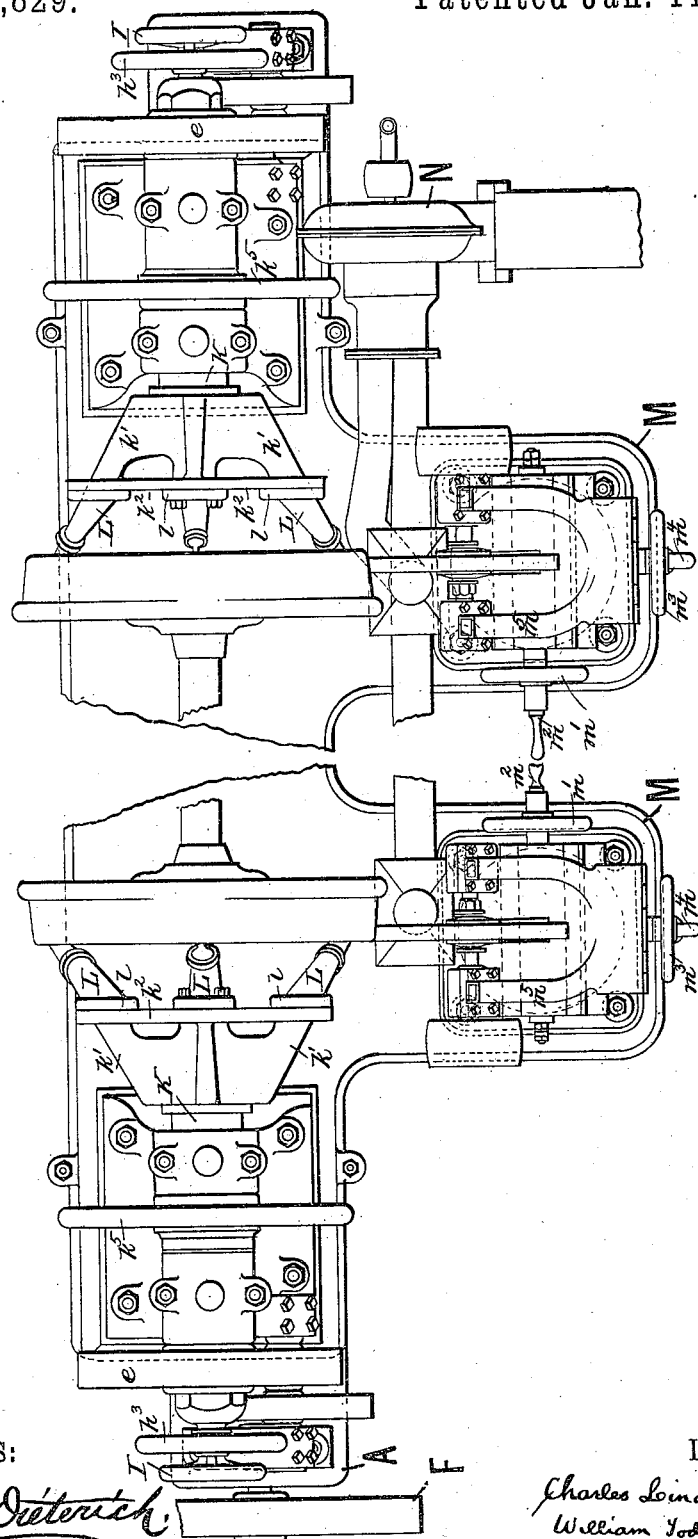
Figure 2:
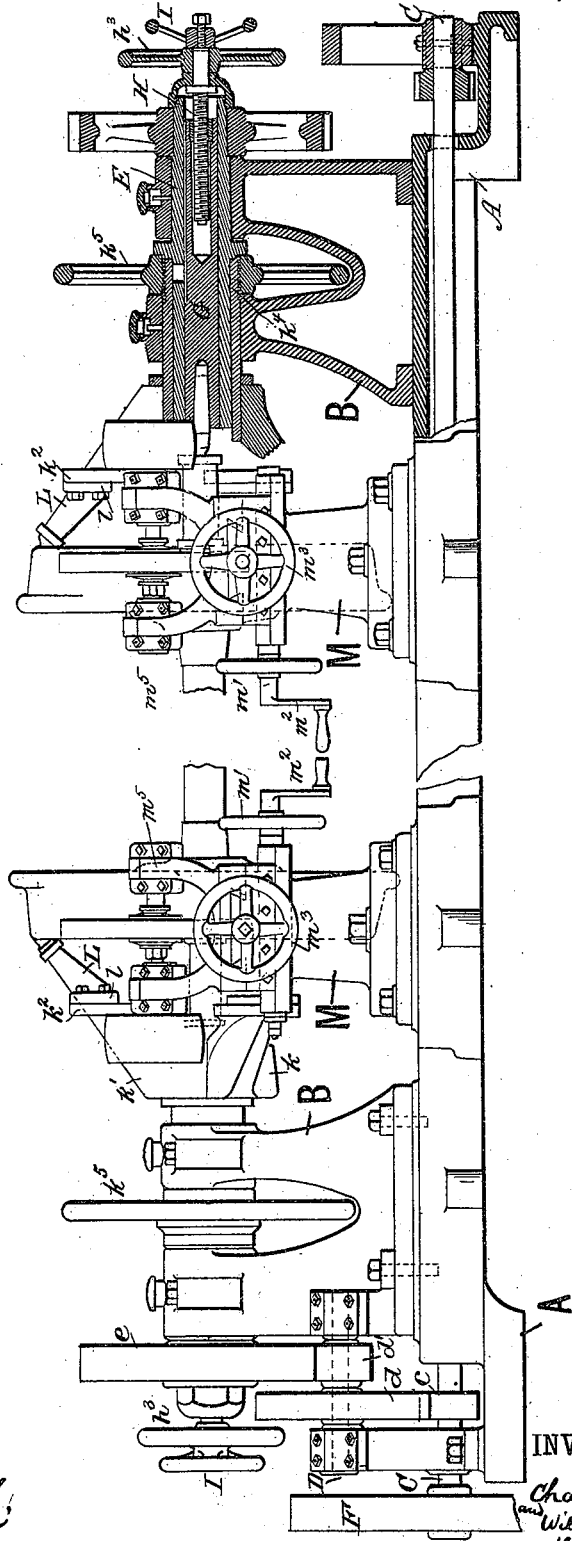
Figure 3:
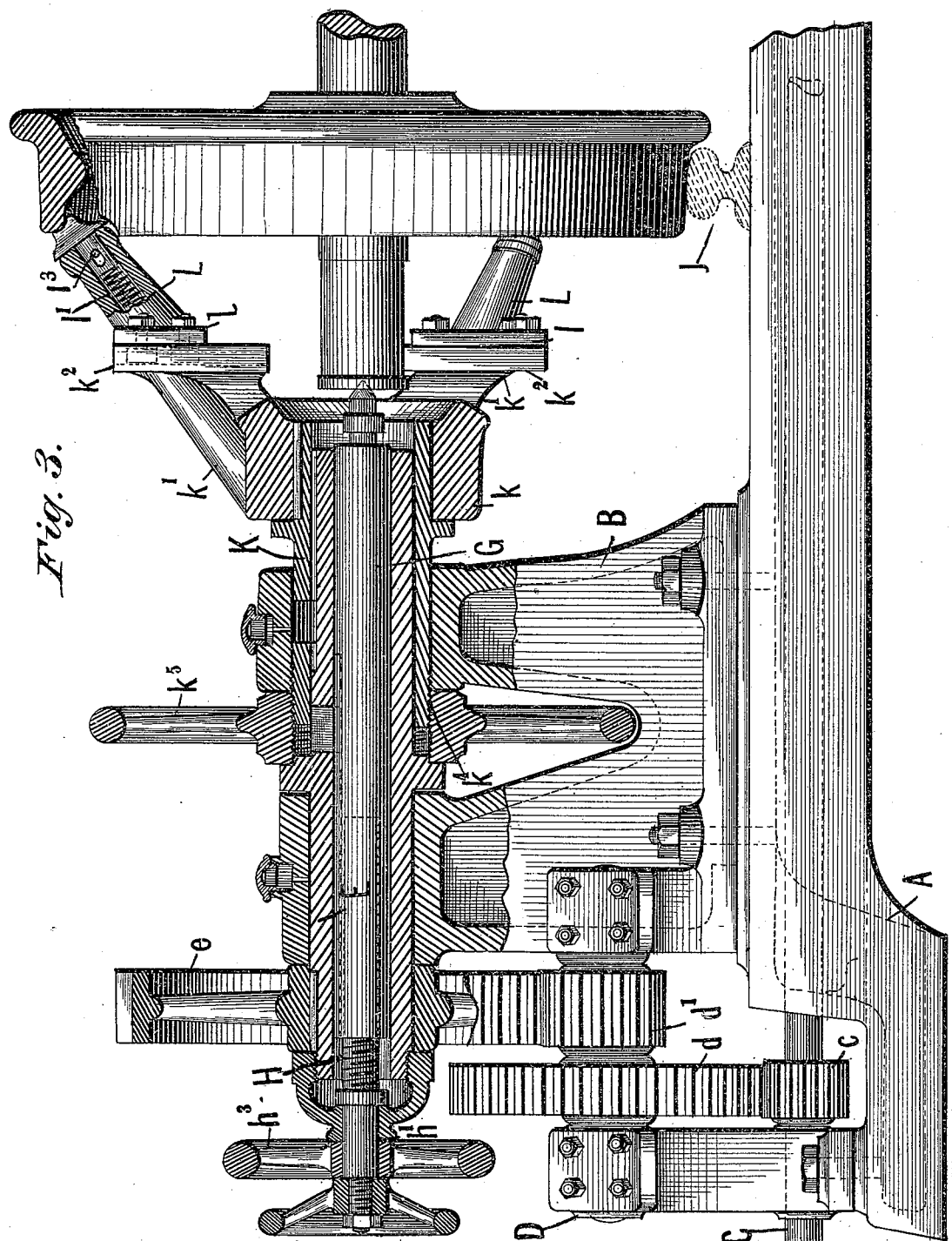
Figure 4:
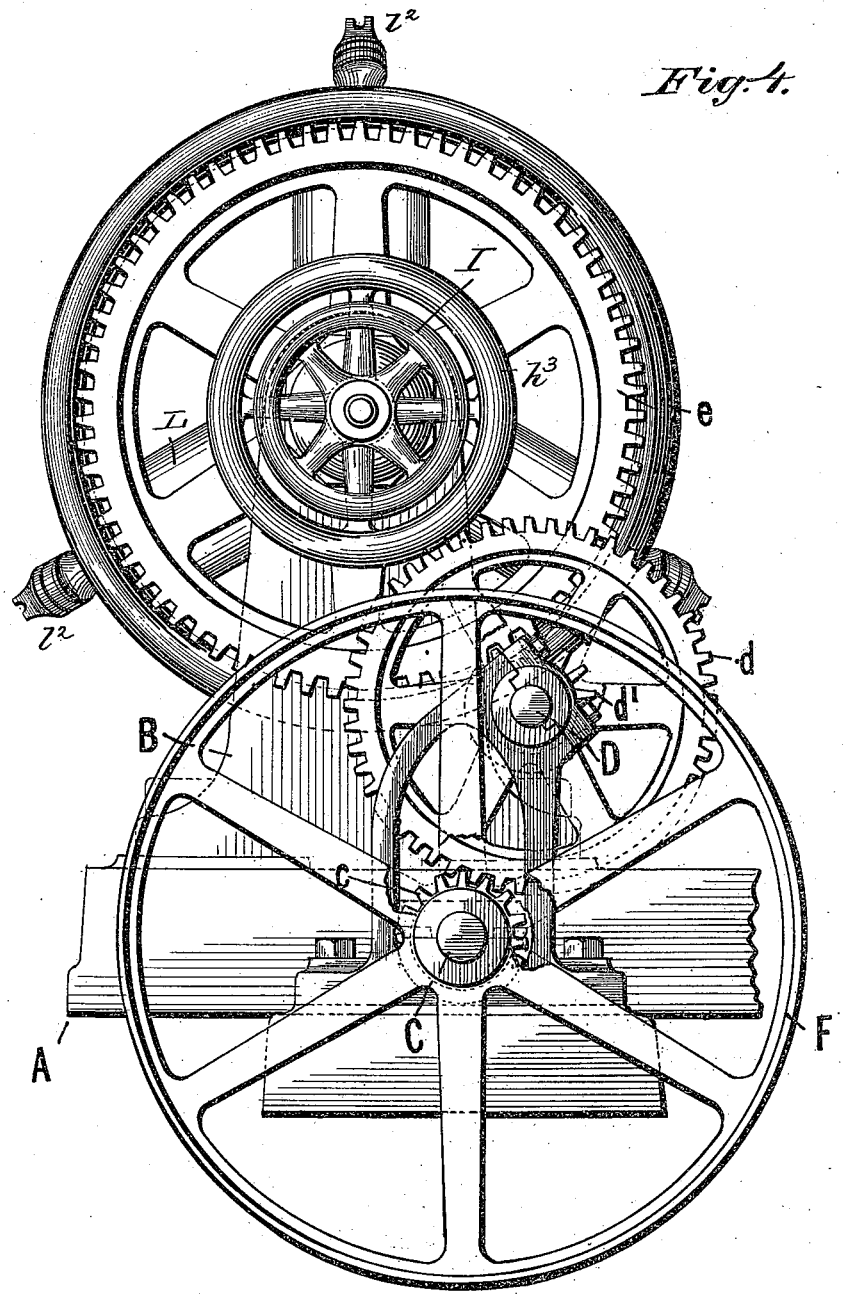
Figure 6:
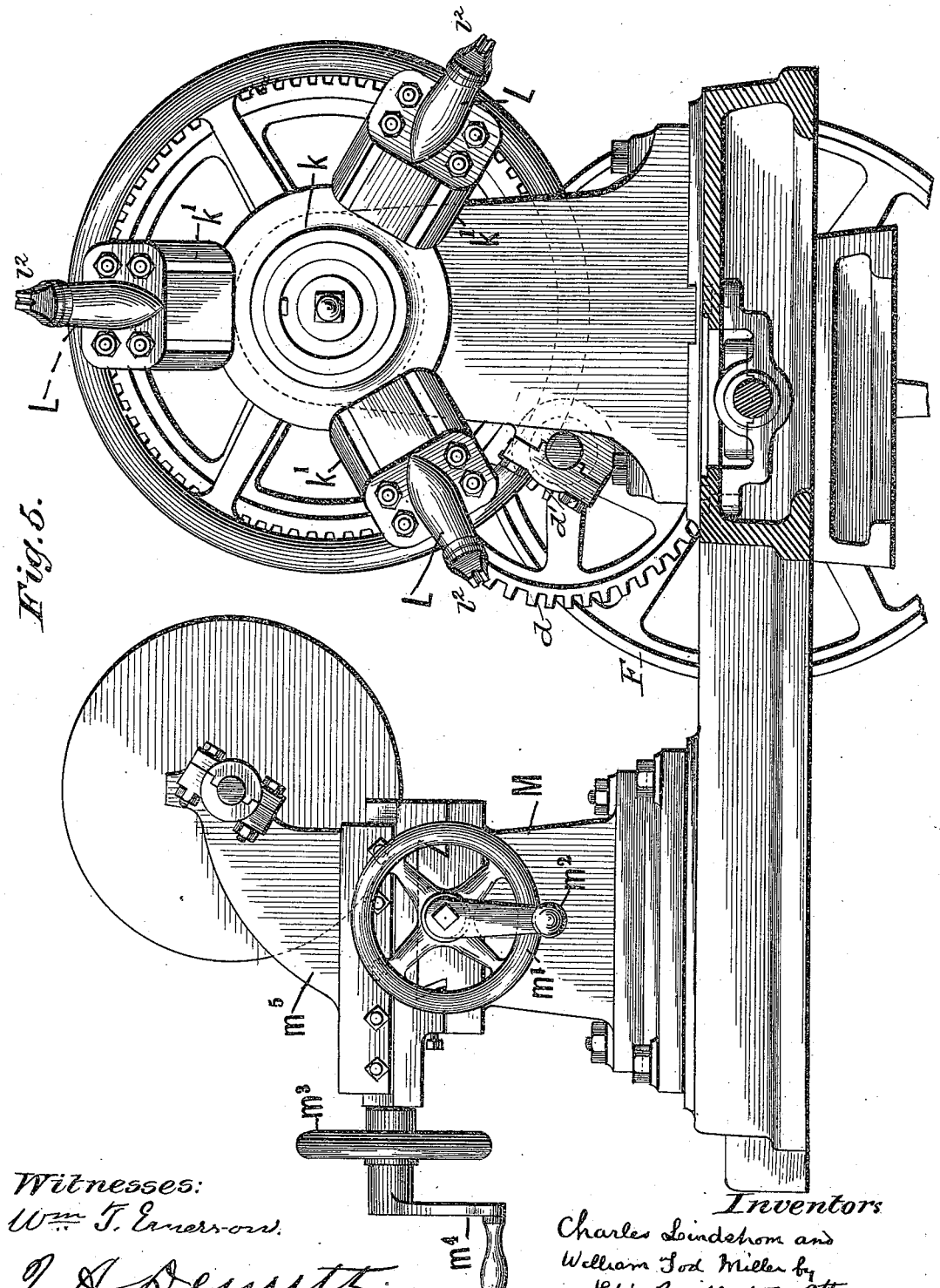

In the drawings, Figure 1 represents a plan view of our improved car-wheel-truing machine, the foundation-plate being broken away in the center and the ends being brought together to permit the more important parts to be drawn upon a larger scale; Fig. 2, a side view of the same, with one end partially in section. Fig. 3 is an enlarged longitudinal view of one end portion of the machine, the upper part of which is shown sectioned longitudinally and centrally; Fig. 4, an end view taken from the left-hand side of the machine; Fig. 5, an end section cut through the center of the bed-plate; Fig. 6 is an enlarged view of the centering-spindle detached and sectioned longitudinally and centrally; Fig. 7, an enlarged side view of the screw by means of which the centering spindle is actuated. Fig. 8 represents an end view of one of the contact-bolts; Fig. 8$^A$, a side view of the same, partly broken away to show the slot $l^4$; and Fig. 8$^B$, a side view of the bolt in position at right angles to Fig. 8$^A$, and showing the end of slot $l^4$ and pin $l^5$; Fig. 9, a sectional view of the face-plate $k^2$ of one of the bearing-arms, $k'$.

To enable others skilled in the art to make our improved machine, we will proceed to describe fully the construction of the same and the manner of its operation.

For convenience and clearness, the machine will be described under several heads, as follows: First, the main part for giving revolution to the wheels and axle and supporting parts—that is, the main shaft, the auxiliary shaft, and gearing; second, the mechanism for centering the axle and attached wheels and holding them securely in their centered position; third, mechanism for advancing the clamping mechanism proper for securing the wheels at their rims into proper bearing contact; fourth, the clamping mechanism proper, and, fifth, the grinding mechanism.

*First.* The main part for giving revolution to the wheels and axle and the supporting parts—that is, the shaft, the auxiliary shaft, and the system of gearing.

A, Figs. 1, 2, 3, and 4, represents a foundation-plate or bed of proper size and shape, which serves for a main support for the superstructure, in the manner well understood.

B B, Figs. 2, 3, and 4, represent head-stocks or standards of proper construction, one being located near each end of the machine, as shown.

C, Figs. 2, 3, and 4, represents the main shaft extending the entire length of the machine, which is supported at its center and near each end by any proper bearing blocks or standards.

As both ends of the machine are constructed precisely alike, for the purpose of permitting each wheel to be acted on simultaneously, reference will be made in the further description of the invention to one end only.

D, Figs. 3 and 4, represents an auxiliary shaft located a short distance above the main shaft, and supported by an extended portion of the bearing of the latter and an auxiliary bearing, as shown.

$c$ represents a pinion located on the main shaft C at the proper point, and *d* a gear-wheel secured to the auxiliary shaft D, which engages therewith.

*d'* represents a pinion located on the shaft D, adjacent to the gear-wheel *d*, which pinion engages with a gear-wheel, *e*, rigidly secured to the hollow cylindrical casting or sleeve E, Fig. 3, as shown, which sleeve is properly supported in the bearings of the head-stock B in such manner as to be capable of free revolution at the proper time without the possibility of longitudinal movement. The sleeve E, by means of a proper key or feather, is united to the sleeve K of the clamping mechanism, the arms of which bear against the rim of the wheel and communicate movement thereto, as will be fully described hereinafter.

F represents the pulley on the main shaft by means of which movement from the main source of power is obtained.

The operation of these parts is substantially as follows: The pair of wheels having been properly adjusted and secured in the machine, as will be hereinafter described, and the machine having been set in motion, the revolution of the pulley F and the main shaft C attached thereto will be communicated to the pinion *c* secured thereto, the gear-wheel *d* on the auxiliary shaft D, the pinion *d'* on the same shaft, and gear-wheel *e* on sleeve E. From the sleeve E movement is given to the sleeve K of the clamping mechanism and its bearing-arms. By the revolution of the wheel thus held in proper contact with the grinding-wheels, the desired grinding action is obtained, in the manner well understood.

*Second.* The mechanism for centering the axle and wheels attached and holding them securely in their centered position.

G, Figs. 3 and 6, represents a spindle located within the sleeve E, which is adapted to move freely therein in a longitudinal direction, but is held against independent revolution by means of a proper key or feather, in the manner shown.

*g*, Fig. 6, represents an ordinary centering bolt or point held in a proper recess at the inner end of the spindle, as shown.

*g'* represents a long recess at the outer end of the spindle, and *g²* a threaded socket-ring, preferably of brass, set into the end of the spindle for the purpose of simplifying the manufacture of the same.

H, Figs. 3 and 7, represents a screw adapted to extend into the long recess of the spindle, which is provided near its outer end with a collar, *h*, Fig. 7, a portion, *h'*, adapted to rest in the bearing secured to the sleeve E, a portion, *h²*, adapted to receive the wheel *h³*, Fig. 3, which is rigidly attached thereto, and a diminished threaded portion, *h⁴*, Fig. 7, adapted to receive the internally-threaded locking-wheel I, Fig. 3, as shown, this wheel being itself secured in place by a nut, as shown. This screw H, by means of its portion *h'*, rests in the bearing on sleeve E, as shown in Fig. 3, in such manner as to revolve freely without any capacity for longitudinal movement. These spindles are advanced by simply revolving the hand-wheel *h³*, Fig. 3, with the screw H, Figs. 3 and 7, the thread of which, by engaging with the corresponding screw-thread of the socket-ring *g²*, moves the spindle along in the manner well understood. When the spindle is properly centered, the hand-wheel I, which acts as a jam-nut, is turned sufficiently to lock the parts securely in position.

*Third.* The mechanism for advancing the clamping mechanism proper for securing the wheels at their rims into proper bearing contact.

K, Fig. 3, represents a sleeve located on the outside of the sleeve E, toward the inner end of the same, which is secured thereto by means of a proper key or feather in such manner as to be capable of sliding freely in a longitudinal direction thereon, but not capable of revolving independently thereon.

*k* represents an annular head extending from the sleeve K, which head is provided with three or more arms, *k'*, having face-plates *k²*, with grooves *k³*, Fig. 9, adapted to hold the corresponding parts of the socket-pieces L, hereinafter referred to, which socket-pieces serve to hold the bearing-bolts of the arms against the rim of the wheel.

*k⁴*, Fig. 3, represents an external screw-thread upon the outer end of the sleeve K, and *k⁵* a hand-wheel held by proper bearings on the sleeve in such manner as to revolve freely without capacity for longitudinal movement, which wheel *k⁵* is provided with internal screw-threads adapted to engage with the screw-threads *k⁴* on the outer face of the sleeve K.

The operation is substantially as follows: After the axle has been properly centered in the machine, the hand-wheel *k⁵* is revolved to cause, by the engagement of its internal screw-threads with the external screw-threads of the sleeve K, the latter to move longitudinally on the sleeve E in the manner well understood. By means of this longitudinal movement, the contact-bolts of the socket-pieces L on the bearing-arm *k'* are brought to bear against the rim of the wheel. By the action of this mechanism at each end of the machine, the pair of wheels is strongly clamped and securely held against the resistance of the grinding action.

*Fourth.* The clamping mechanism proper.

*k*, Figs. 3 and 5, represents the annular head or block before referred to, extending from the sleeve K, and *k' k' k'* the arms having the face-plates *k² k²*, Figs. 3 and 9, with grooves *k³ k³*, Fig. 9.

L represents a socket-piece having a base-plate, *l*, Fig. 3, adapted to be secured by bolts to the face-plate *k²* in such manner as to be capable of radial adjustment.

*l'*, Figs. 3 and 8ᴬ and 8ᴮ, represents a strong spring held in the socket-piece, and *l²*, Fig. 8, a bolt or rod having an enlarged head with two or more curved blades formed thereon, adapted to engage with the outer edge of the rim of the wheel, as shown in Fig. 3.

$l^3$, Figs. 3 and 8$^B$, represents a pin on the socket-piece, projecting into the slot $l^4$ of the bolt, for the purpose of securing the bolt without interference with its capacity for longitudinal movement.

The operation is substantially as follows: When the bearing-arms $k'$ $k'$ of the clamping mechanism are moved forward toward the wheel by the action of the advancing mechanism before described, the blades of each contact-bolt $l^2$ comes into contact with the rim of the car-wheel, as shown in Fig. 3, and securely holds the same. By means of the strong spring in the socket-piece of the bolts, a firm bearing is obtained at each holding-point, even if the rims themselves are not perfectly true. By means of the face-plate $k^2$ upon the bearing-arm $k'$ and the face-plate $l$ upon the socket-piece L, the socket-piece may be adjusted radially when desired to suit different sizes of wheels. Any other proper means of adjustment may be employed in place of that shown. Any proper spring also may be employed in the socket-piece. The bearing-arms and socket-pieces may be made in one piece, if desired.

*Fifth.* The grinding mechanism.

M, Fig. 5, represents one of the grinding-heads firmly secured by bolts to the bed-plate in the proper position. By means of the hand-wheels and handles $m'$ $m^2$ and $m^3$ $m^4$, secured to screws having nuts properly fastened to the slides, the abrading-wheels are operated.

$m^5$ represents the top slide, having wing-like arms with bearings for the abrading-wheel shaft, permitting the abrading-wheels to partly run into the slides and then into specially made grooves. This construction strongly and firmly supports the abrading-wheels, prevents any yielding of the parts, and makes the surface of the cast-iron wheels smooth and round.

N, Fig. 1, represents a fan or blower case having the proper connections with the machine, this being employed for carrying off the dust, in the manner well understood.

The general operation of the machine is substantially as follows: The socket-pieces L having been adjusted upon the bearing-arms $k'$ to suit the size of wheels which are to be acted upon, the grinding-wheels having been moved on their supporting-bed back into their normal inoperative positions, the centering-spindles having been moved in the sleeves back into their normal inoperative positions, and the advancing mechanisms of the clamping mechanism proper having been moved back into their normal inoperative positions, the machine is ready to receive a pair of wheels. These are then advanced by revolving the hand-wheel $h^3$, in the manner before described, until the proper contact is made. The spindles are then secured in place by the lock-wheels I, as before described. The advancing of the clamping mechanism proper is then actuated by revolving the hand-wheels $k^5$, as has before been described, to cause the bolts $l^2$ of the socket-pieces L upon the bearing-arms $k'$ to engage with the rims of the wheels at the proper point. The pair of wheels and axle thus being properly centered and the wheels being firmly clamped at their rims, they are ready for the grinding action. Motion then having been communicated to the pulley F, the wheels and the proper supporting parts are all caused to revolve upon the bearings of the head-stocks in the manner well understood. The grinding-wheels are then moved forward into their proper operative positions in the manner well understood.

Some of the advantages of the described construction are as follows: By the use of two head-stocks being substantially alike it becomes possible to keep the wheels in front of the abrading-wheels without moving the supports of the latter from their permanent position on the bed-plate. By the use of two head-stocks, each having clamping mechanism, a rotary motion free from vibration is imparted to the wheels. By the use of the adjustable arms on the clamping mechanism wheels of different diameter can be trued up. By the use of independent longitudinally-movable centering-spindles in the relatively-fixed sleeves E, in connection with the clamping-heads, it becomes possible to support and revolve wheels for grinding, whether the axles on which the wheels are mounted extend outside of the wheels, as with outside journals, or stop at the hub of the wheels, as with inside journals, for as the power to revolve the wheels is transmitted near the periphery, and not at the axle, the length of the latter is immaterial. By the use of the socket-pieces and springs an elastic bearing is obtained which will make proper contact without regard to the inequalities of the wheel. By means of this construction, also, the engagement of the contact part is quickly effected without requiring special attention on the part of the operator. The construction of the machine as a whole is such that the introduction and removal of the wheels can be accomplished with great rapidity, no time being required to specially adjust or fasten any part.

Having thus fully described our invention, what we claim as new, and desire to secure by Letters Patent, is—

1. The combination of the following elements: the described mechanism for centering the axle and wheels and the described mechanism for adjusting the clamping device, consisting, essentially, of the sleeve K and head $k$, having the arms $k'$, and yielding contact-bolts located on the arms, as described.

2. The adjusting mechanism $k$ $k$ $k'$ $k'$, in combination with the yielding contact-bolts adjustably secured to a slotted face-plate, as and for the purpose specified.

3. The sleeve K, with head $k$, bearing-arms $k'$, and face-plates $k^2 k^2$, in combination with the socket-pieces L, having the yielding contact-bolts, as described.

4. The bearing-arms $k'$, having face-plates $k^2$, in combination with the socket-pieces L, having the base-plate $l$, and the fastening device, as described.

This specification signed and witnessed this 17th day of August, 1885.

CHARLES LINDSTRÖM.
WILLIAM TOD MILLER.

Witnesses:
W. D. COUCH,
THOS. P. FOSTER.